(12) United States Patent
Won et al.

(10) Patent No.: US 9,029,480 B2
(45) Date of Patent: May 12, 2015

(54) PREPARATION METHOD OF SUPERABSORBENT POLYMER

(75) Inventors: Tae-Young Won, Daejeon (KR); Chang-Sun Han, Daejeon (KR); Gi-Cheul Kim, Daejeon (KR); Sang-Gi Lee, Daejeon (KR); Kyu-Pal Kim, Yeosu-si (KR); Sung-Soo Park, Seoul (KR); Gyu Leem, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/824,970

(22) PCT Filed: Nov. 28, 2011

(86) PCT No.: PCT/KR2011/009118
§ 371 (c)(1),
(2), (4) Date: Nov. 5, 2013

(87) PCT Pub. No.: WO2012/074254
PCT Pub. Date: Jun. 7, 2012

(65) Prior Publication Data
US 2014/0051813 A1 Feb. 20, 2014

(30) Foreign Application Priority Data
Nov. 30, 2010 (KR) .................. 10-2010-0120812

(51) Int. Cl.
*C08J 7/12* (2006.01)
*B01J 20/26* (2006.01)
*C08J 3/24* (2006.01)

(52) U.S. Cl.
CPC *B01J 20/267* (2013.01); *C08J 7/12* (2013.01); *C08J 2335/00* (2013.01); *C08F 2810/10* (2013.01); *C08F 2500/24* (2013.01); *B01J 2220/68* (2013.01); *C08J 3/245* (2013.01); *C08J 2300/14* (2013.01); *B01J 20/261* (2013.01)

(58) Field of Classification Search
None
See application file for complete search history.

(56) References Cited

U.S. PATENT DOCUMENTS

| 5,002,986 A | 3/1991 | Fujiura et al. |
| 5,486,569 A | 1/1996 | Henderson et al. |
| 2003/0008946 A1 | 1/2003 | Dairoku et al. |
| 2007/0123658 A1* | 5/2007 | Torii et al. .................. 525/329.7 |
| 2009/0299315 A1 | 12/2009 | Flohr et al. |

(Continued)

FOREIGN PATENT DOCUMENTS

| JP | 56-161408 A | 12/1981 |
| JP | 57-158209 A | 9/1982 |
| JP | 57-198714 A | 12/1982 |

(Continued)

*Primary Examiner* — Robert C Boyle
(74) *Attorney, Agent, or Firm* — McKenna Long & Aldridge LLP (57) ABSTRACT

The present invention relates to a preparation method of a superabsorbent polymer, and specifically to a method of preparing a superabsorbent polymer including the steps of: preparing a hydrous gel phase polymer by thermal polymerizing or photo-polymerizing a monomer composition including a water-soluble ethylene-based unsaturated monomer and a polymerization initiator; drying the hydrous gel phase polymer; milling the dried polymer; classifying the milled hydrous gel phase polymer into two or more grades by particle size; adding a surface cross-linking agent to each hydrous gel phase polymer classified into two or more grades; and carrying out a surface cross-linking reaction of the hydrous gel phase polymer to which the surface cross-linking agent is added.

13 Claims, 2 Drawing Sheets

(56) References Cited

U.S. PATENT DOCUMENTS

2009/0318633 A1 12/2009 Funk et al.
2010/0222758 A1 9/2010 Dairoku et al.

FOREIGN PATENT DOCUMENTS

| JP | 2930555 | B2 | 5/1999 |
| JP | 11-279288 | | 10/1999 |
| JP | 2004-359943 | A | 12/2004 |
| JP | 2007-144423 | | 6/2007 |
| JP | 2010-053296 | A | 3/2010 |
| JP | 4583516 | B2 | 9/2010 |
| KR | 10-1995-0006118 | B1 | 6/1995 |
| KR | 10-2011-0049072 | | 5/2011 |
| KR | 10-2011-0111938 | | 10/2011 |

* cited by examiner

PREPARATION METHOD OF SUPERABSORBENT POLYMER

This application is a National Stage Entry of International Application No. PCT/KR2011/009118, filed Nov. 28, 2011, and claims the benefit of Korean Patent Application No. 10-2010-0120812, filed on Nov. 30, 2010, all of which are hereby incorporated by reference in their entirety for all purposes as if fully set forth herein.

BACKGROUND OF THE INVENTION (a) Field of the Invention

The present invention relates to a preparation method of a superabsorbent polymer, and specifically to a method that can improve process efficiency and the work environment by minimizing fine powder generation and that can provide a superabsorbent polymer having high water holding capacity and absorbing power under pressure while having a low content of a water-soluble component.

(b) Description of the Related Art

A superabsorbent polymer (SAP) is a synthetic polymer material having a function of absorbing about 500 to about 1000 times its weight of water, and it has been differently called a superabsorbency material (SAM), an absorbent gel material (AGM), and so on by developing enterprises. The superabsorbent polymer disclosed above started to be commercialized for sanitary items, and is now being used widely as a water combination soil for horticulture, a water-stop material for civil engineering and construction, a nursery sheet, a freshness preservative in the food distribution field, a poultice material, and the like in addition to the sanitary fittings like a paper diaper for a child.

An inverse suspension polymerization method or an aqueous polymerization method is known as a method of preparing a superabsorbent polymer. For example, inverse suspension polymerization is disclosed in Japanese Patent Publication Nos. Sho56-161408, Sho57-158209, Sho57-198714, and so on. As the aqueous polymerization method, a thermal polymerization method of polymerizing a hydrous gel phase polymer while fracturing and cooling the same in a kneader equipped with a plurality of spindles, and a photo-polymerization method of exposing a high-concentrated aqueous solution on a belt to UV rays and the like so as to carry out the polymerization and dry it at the same time are known.

Meanwhile, a polymer powder obtained from the processes of polymerization, pulverization, drying, and final milling is surface treated for obtaining a hydrous gel phase polymer having excellent properties, and various modifications of the processes have been attempted for increasing the effects of the steps of polymerization, pulverization, and drying in order to obtain a hydrous gel phase polymer having excellent properties.

SUMMARY OF THE INVENTION

It is an aspect of the present invention to provide a method of preparing a superabsorbent polymer that can improve process efficiency and the work environment by minimizing fine powder generation and that can provide the superabsorbent polymer having high water holding capacity and absorbing power under pressure (AUP) while having a low content of a water-soluble component.

The present invention provides a method of preparing a superabsorbent polymer including the steps of: preparing a hydrous gel phase polymer by thermal polymerizing or photo-polymerizing a monomer composition including a water-soluble ethylene-based unsaturated monomer and a polymerization initiator; drying the hydrous gel phase polymer; milling the dried polymer; classifying the milled hydrous gel phase polymer into two or more grades by particle size; adding a surface cross-linking agent to each hydrous gel phase polymer classified into two or more grades; and carrying out a surface cross-linking reaction of the hydrous gel phase polymer to which the surface cross-linking agent is added.

DETAILED DESCRIPTION OF THE EMBODIMENTS

Hereinafter, the method of preparing the superabsorbent polymer according to specific embodiments of the present invention is explained in more detail.

According to one embodiment of the present invention, a method of preparing a superabsorbent polymer is provided, including the steps of: preparing a hydrous gel phase polymer by thermal polymerizing or photo-polymerizing a monomer composition including a water-soluble ethylene-based unsaturated monomer and a polymerization initiator; drying the hydrous gel phase polymer; milling the dried polymer; classifying the milled hydrous gel phase polymer into two or more grades by particle size; adding a surface cross-linking agent to each hydrous gel phase polymer classified into two or more grades; and carrying out a surface cross-linking reaction of the hydrous gel phase polymer to which the surface cross-linking agent is added.

From the results of research of the present inventors, it was recognized that the surface cross-linking agent can be uniformly distributed throughout the polymer and the surface cross-linking reaction can be uniformly and effectively fulfilled, and accordingly, high water holding capacity and absorbing power under pressure can be secured while significantly lowering the content of water-soluble component, when the surface cross-linking reaction is carried out by spraying a solution including the surface cross-linking agent to each polymer of the two or more grades that are classified by particle size.

Particularly, the method of preparing a superabsorbent polymer makes it possible to form granules by cohering the fine powder having the particle size of less than 150 μm, and accordingly not only can the amount of the fine powder generated in the succeeding processes be apparently decreased but also the amount of the fine powder included in the final product can be minimized, by treating one group of polymer having a particle size of less than 150 μm with the surface cross-linking agent individually after classifying the polymer into one group having a particle size less than 150 μm and one or more groups having a particle size of 150 μm or more.

Heretofore, the surface cross-linking agent has been treated to the whole milled or classified polymer, and it has been usual for the polymer powder having a particle size of less than a certain value to not be used in the surface cross-linking reaction step and it is recycled and reused in the polymerizing device or the monomer solution composition, or other processes, because it is difficult for the polymer powder having the particle size of less than a certain value to be classified in the succeeding classification process and there is a concern of decreasing the properties of the final product or making the process conditions inferior. However, there was a problem that the process for circulating such fine powder to a separate recycle process and reusing the same incurs additional process costs and takes a lot of additional time.

However, according to the method of preparing a superabsorbent polymer of one embodiment of the present invention, not only can the amount of the fine powder generated in the final manufacturing step be minimized without adding a process of separating and recycling the fine powder included in the milled polymer particles, but also a superabsorbent resin having high water holding capacity and absorbing power under pressure while largely reducing the content of the water-soluble component can be provided. Specifically, the content of the fine powder having the particle size less than 150 μm included in the final superabsorbent polymer prepared according to said method may be 1.2 weight % or less, and preferably 0.1 to 1.2 weight %.

The classification in the method of preparing a superabsorbent polymer may be carried out separating the particles into two grades having a particle size of less than 150 μm and having a particle size of 150 μm to 850 μm; into three grades having a particle size of less than 150 μm, having a particle size of 150 μm or more and less than 300 μm, and having a particle size of 300 μm to 850 μm; or into four grades having a particle size of less than 150 μm, having a particle size of 150 μm or more and less than 300 μm, having a particle size of 300 μm or more and less than 600 μm, and having a particle size of 600 μm to 850 μm.

Further, the polymer may be classified into five or more grades for inducing uniform distribution of the surface cross-linking agent added to the polymer particles as occasion demands, and the ratio of specific surface area per the unit weight of the polymer particle may be the criteria of the classified particle size.

When the number of classification grades increases, there is an advantage in that the surface cross-linking agent added to the polymer particles can be distributed more uniformly. Considering the uniformity of the added surface cross-linking agent and the economics of the process, a suitable process may be selected from the two or more classification grades.

Figure 1:
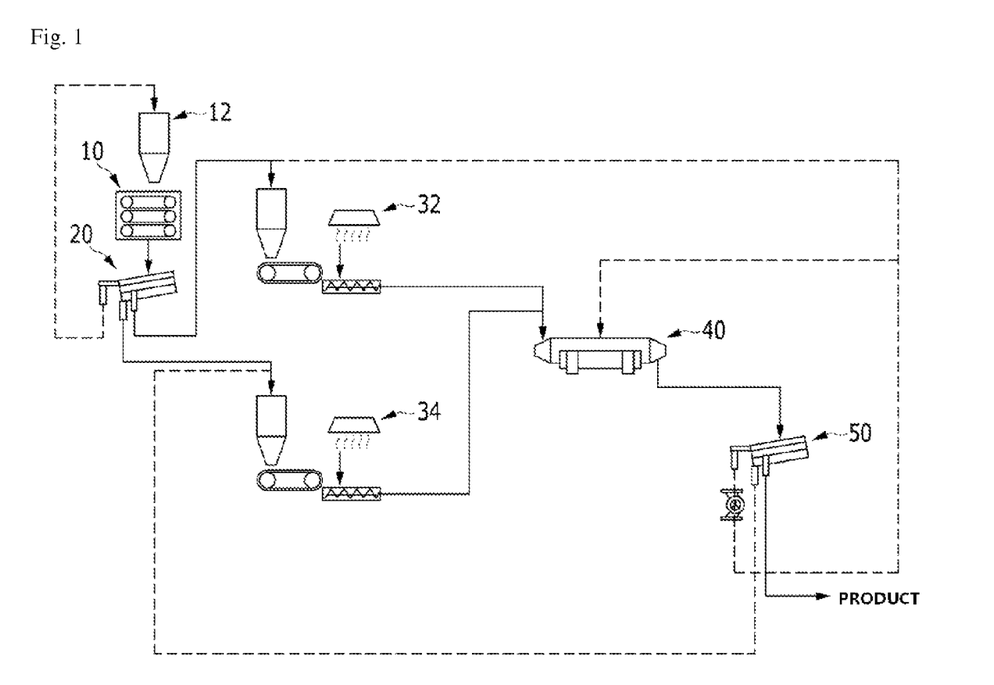
FIG. 1 is a drawing briefly showing the preparation method of the superabsorbent polymer according to one embodiment of the present invention.
Figure 2:
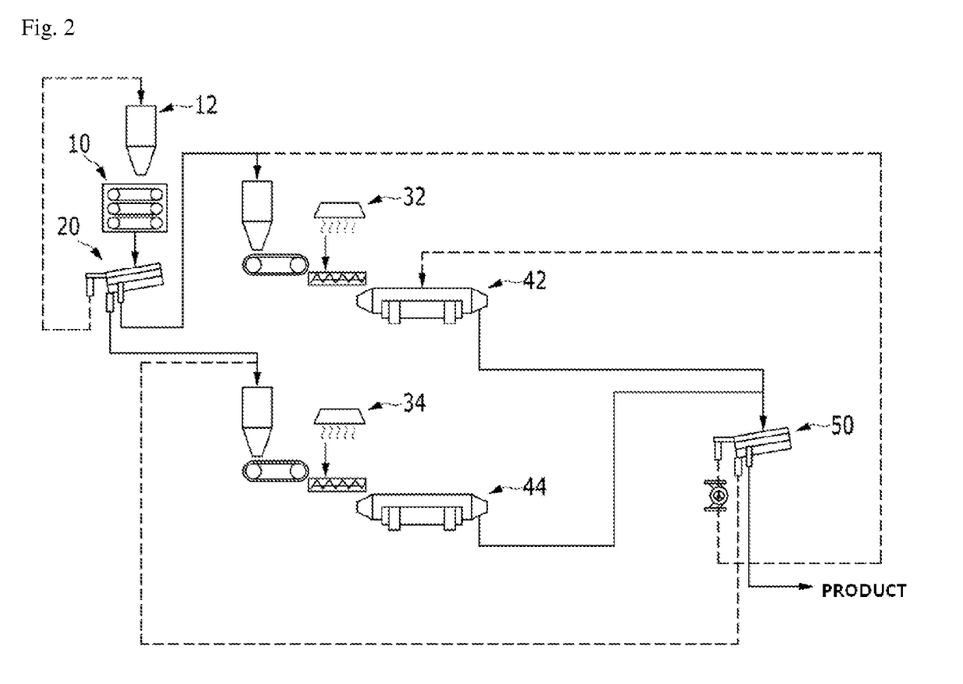
FIG. 2 is a drawing briefly showing the preparation method of the superabsorbent polymer according to another embodiment of the present invention.

For reference, FIGS. 1 and 2 represent schematic drawings of post-treatment processes including the final milling step in the method of preparing the superabsorbent polymer according to one embodiment of the present invention. In FIGS. 1 and 2, the solid lines represent the transfer route of the polymer, and the broken lines represent the additional transfer route of the recycled polymer. Specifically referring to FIG. 1, the hydrous gel phase polymer provided from a polymer feeder 12 is milled to a particle size of 150 to 850 μm, for example in a milling device for a polymer 10, and is classified in a first classifying device 20. The fine powder having a particle size of less than 150 μm may not be classified separately, and only particles having a particle size larger than 850 μm may be classified and returned to the milling device, unlike prior techniques.

Meanwhile, the first classifying device 20 may classify the polymer into two or more grades by particle size according to process design, and FIG. 1 represents an example of classifying the polymer into particles having a particle size of less than 300 μm and particles having a particle size of 300 to 850 μm. The particles having a particle size of less than 300 μm are transferred to a conveyor belt equipped with a second surface cross-linking agent sprayer 34 in FIG. 1, and the surface cross-linking agent is sprayed thereto. Further, particles having a particle size of 300 to 850 μm are transferred to the conveyor belt equipped with a first surface cross-linking agent sprayer 32 in FIG. 1, and the surface cross-linking agent is sprayed thereto. At this time, the constituents of the first surface cross-lining agent and the second surface cross-lining agent are may be same or different according to the case.

As disclosed above, the polymer particles including the fine powder agglomerate together and form granules in the step of adding the surface cross-linking agent or in the step of the succeeding surface cross-linking reaction, and the amount of fine powder having a particle size of less than a certain value (for example, a particle size of less than 150 μm) and the content of the same included in the final product can be significantly reduced.

Meanwhile, the surface cross-linking reaction after the step of adding the surface cross-linking agent may be carried out by feeding the hydrous gel phase polymers classified into two or more grades to one surface cross-linking reactor 40, as illustrated in FIG. 1. Furthermore, the surface cross-linking reaction may be carried out by feeding the hydrous gel phase polymers including the surface cross-linking agent and classified into two or more grades to each surface cross-linking reactor, as illustrated in FIG. 2.

Specifically, FIG. 2 represents the processes of adding the surface cross-linking agent to the hydrous gel phase polymers classified into two or more grades, feeding each hydrous gel phase polymer to a first surface cross-linking reactor 42 and a second surface cross-linking reactor 44, and carrying out the surface cross-linking reaction.

Meanwhile, "hydrous gel phase polymer" is a polymer obtained by polymerizing certain monomers, and it means a gel-type polymer including a certain content of water. In the method of preparing a superabsorbent polymer, a hydrous gel phase polymer having a moisture content of 40 to 80 weight % that is prepared by thermal polymerizing or photo-polymerizing the monomer composition including the water-soluble ethylene-based unsaturated monomer and the polymerization initiator may be used.

Throughout the present specification, "moisture content" means the content of moisture in the weight of the entire hydrous gel phase polymer, and specifically it means the value of the weight of the dried polymer subtracted from the weight of the hydrous gel phase polymer. Furthermore, the moisture content may be defined as the value calculated by measuring the weight loss as water is evaporated from the polymer during a drying process by elevating the temperature of the polymer through infrared heating. At this time, the moisture content is measured by carrying out the drying process with the drying condition of elevating the temperature from room temperature to 180° C. and maintaining the temperature at 180° C., wherein the total drying time is set as 20 minutes including 5 minutes of a temperature increase step.

As disclosed above, the hydrous gel phase polymer may be prepared by thermal polymerizing or photo-polymerizing the monomer composition including the water-soluble ethylene-based unsaturated monomer and the polymerization initiator.

Furthermore, any monomer usually used to prepare a superabsorbent polymer may be used as the water-soluble ethylene-based unsaturated monomer without limitation. At least one selected from the group consisting of an anionic monomer and a salt thereof, a nonionic hydrophilic monomer, and an amino group containing unsaturated monomer and the quaternary compound thereof may be used.

As the specific example of the water-soluble ethylene-based unsaturated monomer, at least one selected from the group consisting of an anionic monomer such as acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, and 2-(meth)acrylamide-2-methyl propane sulfonic acid, and salts thereof; a nonionic hydrophilic monomer such as (meth)acrylamide, N-substituted (meth)acrylate, 2-hydroxyethyl(meth)acrylate, 2-hydroxypropyl(meth)acrylate, methoxy polyethylene glycol (meth)acrylate, and polyethylene glycol (meth)acrylate; and an amino group-containing unsaturated monomer such as (N,N)-dimethylaminoethyl (meth)acrylate and (N,N)-dimethylaminopropyl(meth)acrylate, and a quaternary compound thereof may be preferably used.

Preferably, acrylic acid or a salt thereof may be used as the water-soluble ethylene-based unsaturated monomer, and there is an advantage that a superabsorbent polymer having improved water absorptivity can be obtained by using the acrylic acid or the salt thereof as the monomer.

Meanwhile, the monomer composition may include a certain amount of the fine powder generated during the processes of preparing the superabsorbent polymer, for example the polymer or resin powder having a particle size of less than 150 μm.

Such polymer or resin powder having a particle size of less than 150 μm may be added to the monomer composition before the polymerization reaction is started, or in the first stage, the middle stage, or the last stage after the polymerization reaction is started. At this time, the amount of the polymer or resin powder that can be added thereto is not particularly limited, however the amount is preferably 1 to 10 parts by weight per 100 parts by weight of the monomer included in the monomer resin composition for preventing property deterioration of the superabsorbent polymer finally prepared.

Meanwhile, the concentration of the water-soluble ethylene-based unsaturated monomer in the monomer composition may be suitably determined by considering the polymerization time and the reaction conditions, and it may preferably be 40 to 55 weight %. When the concentration of the water-soluble ethylene-based unsaturated monomer is less than 40 weight %, it is disadvantageous in the aspect of economic feasibility, and when the concentration is larger than 55 weight %, the milling efficiency in the milling process of the polymerized hydrous gel phase polymer may become low.

Further, a general method may be used without limitation if the method can prepare a hydrous gel phase polymer from such monomer composition by thermal polymerization or photo-polymerization. Specifically, the polymerization method is largely classified into the thermal polymerization and the photo-polymerization according to the polymerization energy source, and the thermal polymerization may be carried out in a reactor like a kneader equipped with agitating spindles and the photo-polymerization may be carried out in a reactor equipped with a movable conveyor belt, however the polymerization methods disclosed above are just examples and the present invention is not limited to or by said methods.

For example, the hydrous gel phase polymer obtained from the thermal polymerization in a reactor like a kneader equipped with the agitating spindles disclosed above by providing hot air thereto or heating the reactor may have the size of centimeters or millimeters when it is discharged from the outlet of the reactor, according to the type of agitating spindles equipped in the reactor. Specifically, the size of the obtained hydrous gel phase polymer can be variously shown according to the concentration of the monomer composition fed thereto, the feeding speed, and the like, and the hydrous gel phase polymer of which the weight average particle diameter is 2 to 50 mm can be generally obtained.

Furthermore, in the case of the photo-polymerization carried out with a reactor equipped with a movable conveyor belt disclosed above, the obtained hydrous gel phase polymer may be a sheet-type hydrous gel phase polymer having the same width as the belt. At this time, the thickness of the polymer sheet may vary according to the concentration of the monomer composition fed thereto and the feeding speed, and it is preferable to provide the monomer composition so that a sheet-type hydrous gel phase polymer having a width of 0.5 to 5 cm is obtained. It is not preferable for the monomer composition to be fed so that the thickness of the sheet-type polymer becomes too thin because the production efficiency is low, and when the thickness of the sheet type polymer is larger than 5 cm, the polymerization reaction may not occur evenly throughout the whole thickness due to its excessive thickness.

Meanwhile, the monomer composition includes a polymerization initiator, and it may include a photo-polymerization initiator in the case of a photo-polymerization method or a thermal polymerization initiator in the case of a thermal polymerization method, according to the case. However, even in the case of the photo-polymerization method, a thermal polymerization initiator may be additionally included because a certain amount of heat is generated by irradiation of UV rays and the like and a certain amount of heat is generated according to the progress of the exothermic polymerization reaction.

Specifically, at least one initiator selected from the group consisting of a persulfate-based initiator, an azo-based initiator, hydrogen peroxide, and ascorbic acid may be used as the thermal polymerization initiator. More specific examples of the persulfate-based initiator include sodium persulfate ($Na_2S_2O_8$), potassium persulfate ($K_2S_2O_8$), ammonium persulfate (($NH_4)_2S_2O_8$), and the like; and as examples of the azo-based initiator, 2,2-azobis(2-amidinopropane) dihydrochloride, 2,2-azobis-(N,N-dimethylene)isobutyramidine dihydrochloride, 2-(carbamoylazo)isobutylonitrile, 2,2-azobis(2-[2-imidazolin-2-yl]propane) dihydrochloride, and 4,4-azobis-(4-cyanovaleric acid) may be used. More various thermal polymerization initiators are well-disclosed in "Principle of Polymerization" written by Odian, (Wiley, 1981), p203, however the examples of the thermal polymerization initiator are not limited to or by these.

Meanwhile, at least one initiator selected from the group consisting of benzoin ether, a dialkyl acetophenone, a hydroxyl alkylketone, phenyl glyoxylate, benzyl dimethyl ketal, an acyl phosphine, and an α-aminoketone may be used as the photo-polymerization initiator. As the specific example of the acyl phosphine, commercialized Lucirin® TPO, namely, 2,4,6-trimethyl-benzoyl-trimethyl phosphine oxide, may be used. More various photo-polymerization initiators are well disclosed in "UV Coatings: Basics, Recent Developments and New Applications" written by Reinhold Schwalm, (Elsevier, 2007), p115, however the examples of the photo-polymerization initiator is not limited to or by these.

Meanwhile, the hydrous gel phase polymer obtained according to the thermal polymerization or the photo-polymerization disclosed above passes through a drying step, and it may further pass through a pulverizing step before the drying step for raising the efficiency of the drying step, as occasion demands.

A general pulverizing device may be used in the pulverizing step before the drying step without limitation if the device can be used for pulverizing the hydrous gel phase resin, for example, any one or more devices selected from the group consisting of a vertical pulverizer, a turbo cutter, a turbo grinder, a rotary cutter mill, a cutter mill, a disc mill, a shred crusher, a crusher, a chopper, and a disc cutter may be used.

In the pulverizing step before the drying step, the hydrous gel phase polymer obtained according to the thermal polymerization or the photo polymerization disclosed above may be pulverized so that the weight average particle diameter becomes 1 mm to 15 mm. When the weight average particle diameter is less than 1 mm, the particles may agglomerate and it is technically not easy to pulverize the hydrous gel phase polymer to be less than 1 mm due to its high moisture content. Furthermore, when the weight average particle diameter is larger than 15 mm, the increasing effect of the efficiency of the succeeding drying step may be insignificant.

Meanwhile, in the pulverizing step before the drying step, the hydrous gel phase polymer may stick to the surface of the pulverizing device because it has a high moisture content. Accordingly, a certain additive may be added to the hydrous gel phase polymer for raising the efficiency of the pulverizing step before the drying step.

The kind of the usable additive is not particularly limited, and for example, it may be an anti-agglomeration agent for the fine powder such as steam, water, a surfactant, an inorganic powder such as clay or silica, and the like; a thermal polymerization initiator such as a persulfate-based initiator, an azo-based initiator, hydrogen peroxide, ascorbic acid, and the like; or a cross-linking agent such as an epoxy-based cross-linking agent, a diol-based cross-linking agent, a cross-linking agent including 2-functional or poly-functional (3 or more -functional) acrylate, a mono-functional compound including a hydroxyl group.

When the hydrous gel phase polymer obtained according to the thermal polymerization or the photo-polymerization or the hydrous gel phase polymer pulverized in the pulverizing step before the drying step passes through the drying step, the drying temperature of the drying step may be 150° C. to 250° C. Said "drying temperature" may mean the temperature of the heating medium provided thereto for drying, or the temperature of the drying reactor including the heating medium and the polymer during the drying process.

When the drying temperature is lower than 150° C., there is a concern that the drying time becomes excessively long or the properties of the superabsorbent polymer finally formed may be deteriorated, and when the drying temperature is higher than 250° C., only the surface of the polymer is dried, and thus there is a concern that fine powder may be generated and the properties of the superabsorbent polymer finally formed may be deteriorated, The drying temperature may preferably be 150° C. to 200° C., and more preferably 160° C. to 180° C.

The time for the drying step may be suitably controlled, considering the amount or the properties of the superabsorbent polymer being prepared, the size of the reactor, and so on, and the drying step may be carried out for 20 to 90 minutes, considering the process efficiency.

Furthermore, any generally known method or device may be used in the drying step without limitation if it can be used for drying the hydrous gel phase polymer, and for example, the drying step may be carried out by a method of supplying hot air, irradiating infrared rays, irradiating microwaves, irradiating ultraviolet rays, and the like. When the drying step disclosed above is finished, the moisture content of the hydrous gel phase polymer may be 0.1 to 10 weight %.

Meanwhile, the polymer obtained from the drying step may pass through a certain milling step. The details of a milling device that can be used in the milling step are not particularly limited, and for example, a pin mill, a hammer mill, a screw mill, a roll mill, a disc mill, a jog mill, and the like may be used. The polymer powder obtained from the milling step may have a weight average particle diameter of 150 to 850 μm.

Meanwhile, s classifying step for obtaining the milled polymer of which the weight average particle diameter is 150 to 850 μm may be additionally carried out before the step of milling the polymer obtained from the drying step and adding the surface cross-linking agent thereto. The properties of the superabsorbent polymer powder finally manufactured can be properly controlled through such classifying step, and only a polymer powder having a weight average particle diameter of 150 to 850 μm obtained in the classifying step is selectively applied to the surface cross-linking reaction and finally manufactured. In the classification step, a conventional device or method using vibration may be used without limitation, and for example, a device for separating particles of a specific size by using a fluidized bed and a cyclone may be used.

Meanwhile, a surface cross-linking agent may be added for the surface cross-linking of the milled polymer powder. The surface cross-linking agent is not particularly limited as long as it is a compound that can react to the functional group of the milled polymer, and for preferable examples, there are a polyhydric alcohol compound, an epoxy compound, a polyamine compound, a haloepoxy compound, a condensation product of the haloepoxy compound, an oxazoline compound, a mono-, di-, or polyoxazolidinone compound, a cyclic urea compound, a polyvalent metal salt, an alkylene carbonate compound, and a mixture of two or more of said compounds.

More specifically, as examples of the polyhydric alcohol compound, there is a mono-, di-, tri-, tetra-, or polyethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, 1,2-cyclohexane dimethanol, or a mixture of two or more of said compounds.

As examples of the epoxy compound, ethylene glycol diglycidyl ether and glycidol may be used, and as the polyamine compound, there is ethylene diamine, diethylene triamine, triethylene triamine, tetraethylene pentamine, pentaethylene hexamine, polyethylene amine, polyamide polyamine, or a mixture of two or more of said compounds.

Meanwhile, epichlorohydrin, epibromohydrin, and α-methylephichlorohydrin may be used as the haloepoxy compound. 2-oxazolidinone may be used as the mono-, di-, or polyoxazolidinone compound. Ethylene carbonate may be used as the alkylene carbonate compound.

In order to raise the efficiency of the surface cross-linking reaction process, it is preferable to use one or more polyhydric alcohol compounds among said cross-linking agent, and it is more preferable to use a $C_2$-$C_{10}$ polyhydric alcohol compound.

The amount of the surface cross-linking agent used may be suitably controlled according to the kind of surface cross-linking agent, the characteristics of the milled polymer, or the surface cross-linking reaction conditions, and the amount may be 0.001 to 5 parts by weight, preferably 0.01 to 3 parts by weight, and more preferably 0.05 to 2 parts by weight per 100 parts by weight of the milled polymer. When the amount of the surface cross-linking agent used is too small, the surface cross-linking reaction may not occur practically, and when the surface cross-linking agent is used excessively, the absorptivity and the properties of the final product may be decreased due to excessive surface cross-linking reaction.

The method of adding the surface cross-linking agent to the milled polymer is not particularly limited, and for example, a method of feeding the surface cross-linking agent and the milled polymer powder to the reactor and mixing the same, spraying the surface cross-linking agent to the polymer powder, or mixing the milled polymer powder and the cross-linking agent while continuously feeding the same to a mixer being continuously operated may be used.

At this time, the surface cross-linking agent may be added by mixing it with additional water. When water is added to the surface cross-linking agent, the surface cross-linking agent can be evenly dispersed in the polymer. The amount of water added thereto may be 0.5 to 10 parts by weight per 100 parts by weight of the milled polymer for the purpose of inducing uniform dispersion of the surface cross-linking agent, preventing agglomeration of the polymer powder, and optimizing the surface penetrating depth of the cross-linking agent at the same time.

Meanwhile, the surface temperature of the milled polymer may be 20 to 90° C., and preferably 50 to 80° C., in the step of adding the surface cross-linking agent. When the surface temperature of the milled polymer is maintained in the above range, the surface temperature can be elevated to the surface cross-linking reaction temperature within 1 minute to 60 minutes, and thus a proper surface cross-linking reaction can occur and appropriate properties of the final product can be secured. In order for the milled polymer to have the temperature of said range, the succeeding process may be continuously carried out after the drying step that is carried out at a relatively high temperature, the later process time is reduced, or the polymer is heated separately when it is difficult for the process time to be reduced.

Furthermore, in addition to the method of maintaining or controlling the surface temperature of the milled polymer in a proper range, the temperature of the surface cross-linking agent itself added thereto may be controlled to be 5 to 90° C., preferably 10° C. to 60° C., and more preferably 20 to 40° C. When the temperature of the surface cross-linking agent is lower than 5° C., the effect of reducing the temperature increase speed influencing the surface cross-linking reaction according to the temperature increase may be insignificant, and when the temperature of the surface cross-linking agent is higher than 90° C., uniform mixing of the surface treating agent may be disturbed. Throughout the present specification, the surface cross-linking reaction temperature is defined as the total temperature of the surface cross-linking agent added for the cross-linking reaction and the polymer.

Meanwhile, various means for temperature increase may be used in the step of elevating the temperature of the polymer to which the surface cross-linking agent is added for the surface cross-linking reaction, and for example, the temperature increase may be carried out by providing a heating medium or by directly providing a heat source.

As a specific example of the heating medium, a hot fluid such as steam, hot air, hot oil, and the like may be used, however the specific example is not limited to these. The temperature of the heating medium may be properly controlled by considering the means of the heating medium, the temperature increase speed, and the target temperature. As an example of the heat source provided directly, an electric heater or a gas heater may be used, but it is not limited to these. However, it is preferable that the heating medium has a temperature of 100° C. or more and that the heat source provides thermal energy at a temperature of 100° C. or more, considering that the surface cross-linking reaction temperature disclosed above is 100 to 250° C.

The surface cross-linking reaction may be carried out within a certain time, considering the cross-linking reaction temperature, the characteristics and the amount of the reactants, or the reaction conditions, and the cross-linking reaction may be carried out for 1 minute to 120 minutes, preferably for 1 minute to 60 minutes, and more preferably for 10 minutes to 50 minutes, after the temperature increase to the cross-linking reaction temperature is completed. When the reaction time is shorter than 1 minute, the cross-linking reaction cannot be sufficiently obtained, and when the cross-linking time is longer than 120 minutes, property deterioration may occur because the polymer particles are damaged by excessive surface cross-linking reaction.

According to the method of preparing the superabsorbent polymer disclosed above, the process efficiency and the work environment can be improved by minimizing fine powder generation, and the superabsorbent polymer having high water holding capacity and absorbing power under pressure (AUP) while having a low content of water-soluble component can be provided.

The problems with generating a lot of fine powder in the preparation method of superabsorbent polymer are that the work environment becomes poor, and the efficiency of the process and the quality of the superabsorbent polymer finally manufactured are decreased by the fine powder. However, according to the method of preparing superabsorbent polymer disclosed above, the process efficiency and the work environment can be improved and the property and the quality of the final product can be enhanced because the amount of the fine powder generated in the preparing process can be significantly reduced.

Furthermore, the superabsorbent polymer prepared by the preparation method shows a very low content of monomer residue of 0.05 parts by weight per 100 parts by weight of the high absorbent polymer, and thus it is possible to realize high stability when the final product is applied in practice and a final product of excellent quality can be provided. Furthermore, the superabsorbent polymer provided according to the preparation method may have water holding capacity measured according to the EDANA WSP 241.2 method of 30 g/g to 60 g/g, and water-soluble component measured according to the EDANA WSP 270.2 method of 15 weight % or less.

As disclosed above, since the preparation method of the present invention does not need the additional process for recycling the fine powder polymer, the process efficiency can be improved and the superabsorbent polymer having excellent properties can be prepared.

Hereinafter, the function and effect of the invention are explained in more detail through concrete examples of the present invention. However, the following examples are only for illustrating the present invention, and the scope of the present invention is not determined to or by them.

Preparation Examples

Preparation of Polymer Powder

Preparation Example 1

Preparation of Polymer Powder (without Recycling Fine Powder)

A monomer composition of which the monomer concentration was 50 weight % was prepared by mixing 100 g of acrylic acid, 0.1 g of polyethylene glycol diacrylate as a cross-linking agent, 38.9 g of caustic soda (NaOH), and 103.9 g of water.

Subsequently, the monomer composition was fed to a polymerizing reactor with a continuously rotating kneader through a feed section, and then 1 g of a 1% hydrogen peroxide solution and 1 g of a 2% ascorbic aqueous solution were introduced thereto as the polymerization initiator and mixed with the monomer.

The polymerization was started 1 minute after mixing the polymerization initiator, and the polymerization reaction was carried out for 15 minutes. At this time, the internal temperature of the reactor was 99° C. The polymerized hydrous gel phase polymer was transferred to a cutter and cut to a diameter of 0.2 cm. The moisture content of the cut hydrous gel phase polymer was 50%.

Thereafter, the polymer was obtained by drying the polymer discharged from the cutter with a hot air dryer of 180° C. for 1 hour and milling the same with a pin mill. The obtained polymer was classified into a polymer having a particle size of less than 150 μm and a polymer having a particle size of 150 μm to 850 μm by using a sieve.

The polymer powder classified in like way showed water holding capacity of 45 g/g and a content of water-soluble component of 13%.

Preparation Example 2

Preparation of Polymer Powder (while Recycling Fine Powder)

Monomer Composition 1 of which the monomer concentration was 50 weight % was prepared by mixing 100 g of acrylic acid, 0.1 g of polyethylene glycol diacrylate as a cross-linking agent, 38.9 g of caustic soda (NaOH), and 103.9 g of water.

Monomer Composition 2 was prepared by feeding the fine powder having a particle size of less than 150 μm prepared in Preparation Example 1 to Monomer Composition 1 at a ratio of 14 parts by weight per 100 parts by weight of the monomer (acrylate formed from acrylic acid and NaOH).

Subsequently, Monomer Composition 2 in which the fine powder was dispersed was fed to a polymerizing reactor of a continuously rotating kneader through a feed section, and then 1 g of a 1% hydrogen peroxide solution and 1 g of a 2% ascorbic aqueous solution were introduced thereto as the polymerization initiator and mixed with the monomer.

The polymerization was started 1 minute after mixing the polymerization initiator, and the polymerization reaction was carried out for 15 minutes. At this time, the internal temperature of the reactor was 99° C. The polymerized hydrous gel phase polymer was transferred to a cutter and cut to a diameter of 0.2 cm. The moisture content of the polymer was 49%.

Thereafter, the polymer was obtained by drying the polymer discharged from the cutter in a hot air dryer at 180° C. for 1 hour and milling the same with a pin mill. The obtained polymer was classified into a polymer having a particle size of less than 150 μm and a polymer having a particle size of 150 μm to 850 μm by using a sieve.

The polymer powder classified in this way showed water holding capacity of 40 g/g and a content of water-soluble component of 18%.

Preparation Example 3

Preparation of Polymer Powder (while Recycling Fine Powder)

A monomer composition of which the monomer concentration was 50 weight % was prepared by mixing 100 g of acrylic acid, 0.1 g of polyethylene glycol diacrylate as a cross-linking agent, 38.9 g of caustic soda (NaOH), and 103.9 g of water.

Subsequently, the monomer composition was fed to a polymerizing reactor with a continuously rotating kneader through a feed section, and then 1 g of a 1% hydrogen peroxide solution and 1 g of a 2% ascorbic aqueous solution were introduced thereto as the polymerization initiator and mixed with the monomer.

The polymerization was started 1 minute after mixing the polymerization initiator, and the polymer (fine powder) having a particle size of less than 150 μm prepared in Preparation Example 1 was fed into the kneader reactor at a ratio of 14 parts by weight per 100 parts by weight of the monomer (acrylate formed from acrylic acid and NaOH) 5 minutes after starting the polymerization and mixed, and then the polymerization was further carried out for 10 minutes. At this time, the internal temperature of the reactor was 99° C. The polymerized hydrous gel phase polymer was transferred to a cutter and cut to a diameter of 0.2 cm. The moisture content of the cut hydrous gel phase polymer was 48%.

Thereafter, the polymer was obtained by drying the discharged polymer with a hot air dryer of 180° C. for 1 hour and milling the same with a pin mill. The obtained polymer was classified into a polymer having a particle size of less than 150 μm and a polymer having a particle size of 150 μm to 850 μm by using a sieve.

The polymer powder classified in this way showed water holding capacity of 43 g/g and a content of water-soluble component of 15%.

EXAMPLES

Preparation of Superabsorbent Polymer

Example 1

Preparation of Superabsorbent Polymer (the Surface Cross-Linking Reaction is Carried Out in One Surface Cross-Linking Reactor after the Surface Cross-Linking Agent is Sprayed to Each Polymer Classified into Two Grades)

Among 100 parts by weight of the polymer classified according to Preparation Example 1, polymer A classified into the particle size of less than 150 μm was 14 parts by weight and polymer B classified into the particle size of 150 to 850 μm was 86 parts by weight. The solution including 1.0 part by weight of 1,3-propanediol and 1.0 part by weight of water per 100 parts by weight of the polymer was sprayed to and mixed with each polymer A and B classified by particle size.

The polymers A and B to which the surface cross-linking agent (1,3-propanediol) and water were sprayed were inserted into one surface cross-linking reactor of which the temperature was increased by heated oil and electricity together, and the surface cross-linking reaction was carried out at 180° C. for 20 minutes. The superabsorbent polymer powder was obtained by passing through an additional cooling step after the surface cross-linking reaction.

Example 2

Preparation of Superabsorbent Polymer (the Surface Cross-Linking Reactions are Carried Out in Two Surface Cross-Linking Reactors after the Surface Cross-Linking Agent is Sprayed to Each Polymer Classified into Two Grades)

The superabsorbent polymer powder was obtained substantially according to the same method as in Example 1, except that each polymer A and B classified into the particle size of less than 150 μm and the particle size of 150 to 850 μm according to Preparation Example 1 was separately inserted into two surface cross-linking reactors of which the temperature was increased by heated oil and electricity and the surface cross-linking reaction was carried out.

Example 3

Preparation of Superabsorbent Polymer (the Surface Cross-Linking Reactions are Carried Out in One Surface Cross-Linking Reactor after the Surface Cross-Linking Agent is Sprayed to Each Polymer Classified into Three Grades)

The polymer prepared according to Preparation Example 1 was further classified, and polymer A having the particle size of less than 150 μm, polymer B having a particle size of 150 μm or more and less than 300 μm, and polymer C having a particle size of 300 μm to 850 μm were prepared.

Among 100 parts by weight of total polymer, polymer A classified into the particle size less than 150 μm was 14 parts by weight, polymer B classified into the particle size of 150 μm or more and less than 300 μm was 16 parts by weight, and polymer C classified into the particle size of 300 μm to 850 μm was 70 parts by weight.

The solution including 1.0 part by weight of 1,3-propanediol and 1.0 part by weight of water was sprayed to and mixed with 100 parts by weight of each polymer A, B, and C classified by particle size.

The polymers A, B, and C to which the surface cross-linking agent (1,3-propanediol) and water were sprayed were inserted into one surface cross-linking reactor of which the temperature was increased by heated oil and electricity together, and the surface cross-linking reaction was carried out at 180 for 20 minutes.

The superabsorbent polymer powder was obtained by passing through an additional cooling step after the surface cross-linking reaction.

Example 4

Preparation of Superabsorbent Polymer (the Surface Cross-Linking Reactions are Carried Out in One Surface Cross-Linking Reactor after the Surface Cross-Linking Agent is Sprayed to Each Polymer Classified into Three Grades)

The polymer prepared according to Preparation Example 2 was further classified, and polymer A having a particle size of less than 150 μm, polymer B having a particle size of 150 μm or more and less than 300 μm, and polymer C having a particle size of 300 μm to 850 μm were prepared.

Among 100 parts by weight of total polymer, polymer A classified into the particle size of less than 150 μm was 14 parts by weight, polymer B classified into the particle size of 150 μm or more and less than 300 μm was 16 parts by weight, and polymer C classified into the particle size of 300 μm to 850 μm was 70 parts by weight.

The solution including 1.0 part by weight of 1,3-propanediol and 1 part by weight of water was sprayed to and mixed with 100 parts by weight of each polymer A, B, and C classified by particle size.

The polymers A, B, and C to which the surface cross-linking agent (1,3-propanediol) and water were sprayed were inserted into one surface cross-linking reactor of which the temperature was increased by heated oil and electricity together, and the surface cross-linking reaction was carried out at 180 for 20 minutes.

The superabsorbent polymer powder was obtained by passing through an additional cooling step after the surface cross-linking reaction.

Example 5

Preparation of Superabsorbent Polymer (the Surface Cross-Linking Reactions are Carried Out in One Surface Cross-Linking Reactor after the Surface Cross-Linking Agent is Sprayed to Each Polymer Classified into Three Grades)

The polymer prepared according to Preparation Example 3 was further classified, and polymer A having a particle size of less than 150 μm, polymer B having a particle size of 150 μm or more and less than 300 μm, and polymer C having a particle size of 300 μm to 850 μm were prepared.

Among 100 parts by weight of total polymer, polymer A classified into the particle size of less than 150 μm was 14 parts by weight, polymer B classified into the particle size of 150 μm or more and less than 300 μm was 16 parts by weight, and polymer C classified into the particle size of 300 μm to 850 μm was 70 parts by weight.

The solution including 1.0 part by weight of 1,3-propanediol and 1 part by weight of water was sprayed to and mixed with 100 parts by weight of each polymer A, B, and C classified by particle size.

The polymers A, B, and C to which the surface cross-linking agent (1,3-propanediol) and water were sprayed were inserted to one surface cross-linking reactor of which the temperature was increased by heated oil and electricity together, and the surface cross-linking reaction was carried out at 180 for 20 minutes.

The superabsorbent polymer powder was obtained by passing through an additional cooling step after the surface cross-linking reaction.

Comparative Examples

Comparative Example 1

Preparation of Superabsorbent Polymer

The superabsorbent polymer powder was obtained by carrying out the surface cross-linking process substantially according to the same method as in Example 1, except that the polymer having a particle size of less than 150 μm (14 weight % of total polymer) and the polymer having a particle size of 150 to 850 μm (86 weight % of total polymer) prepared according Preparation Example 1 were mixed together and the surface cross-linking reaction was carried out by spraying the solution including the surface cross-linking agent to the mixed polymer.

Comparative Example 2

Preparation of Superabsorbent Polymer

The superabsorbent polymer powder was obtained by carrying out the surface cross-linking process substantially according to the same method as in Example 1, except that the surface cross-linking reaction was carried out by spraying the solution including the surface cross-linking agent only to the polymer having the particle size of 150 to 850 μm (86 weight % of total polymer) prepared according Preparation Example 2.

Comparative Example 3

Preparation of Superabsorbent Polymer

The superabsorbent polymer powder was obtained by carrying out the surface cross-linking process substantially according to the same method as in Example 1, except that the polymer having a particle size of less than 150 μm (14 weight % of total polymer) and the polymer having a particle size of 150 to 850 μm (86 weight % of total polymer) prepared according Preparation Example 2 were mixed together and the surface cross-linking reaction was carried out by spraying the solution including the surface cross-linking agent to the mixed polymer.

Comparative Example 4

Preparation of Superabsorbent Polymer

The superabsorbent polymer powder was obtained by carrying out the surface cross-linking process substantially according to the same method as in Example 1, except that the surface cross-linking reaction was carried out by spraying the solution including the surface cross-linking agent only to the polymer having a particle size of 150 to 850 μm (86 weight % of total polymer) prepared according Preparation Example 3.

Comparative Example 5

Preparation of Superabsorbent Polymer

The superabsorbent polymer powder was obtained by carrying out the surface cross-linking process substantially according to the same method as in Example 1, except that the polymer having a particle size of less than 150 μm (14 weight % of total polymer) and the polymer having a particle size of 150 to 850 μm (86 weight % of total polymer) prepared according Preparation Example 3 were mixed together and the surface cross-linking reaction was carried out by spraying the solution including the surface cross-linking agent to all of the mixed polymer.

Experimental Examples

Evaluation on Properties of Superabsorbent Polymer

Experimental Example 1

Measurement of Water Holding Capacity of Polymer

The water holding capacity of the superabsorbent polymers obtained in the examples and comparative examples was measured according to the EDANA WSP 241.2 method.

Specifically, after inserting 0.2 g of the specimen having the particle size of 850 to 150 μm among the superabsorbent polymer powders of the examples and comparative examples in a tea bag and soaking the same in a 0.9% salt water solution for 30 minutes, the water holding capacity was measured by eliminating water from the specimen for 3 minutes by using a centrifugal separator set to 250 G and weighing the specimen so as to determine the amount of water held in the superabsorbent polymer.

Experimental Example 2

Measurement of Content of Water-soluble Component of Superabsorbent Polymer

The content of the water-soluble component of the superabsorbent polymers obtained in the examples and comparative examples was measured according to the EDANA WSP 270.2 method.

Specifically, after inserting 1.0 g of the specimen having the particle size of 850 to 150 μm among the superabsorbent polymer powders of the examples and comparative examples in 200 g of a 0.9% salt water solution and soaking the same while stirring at 500 rpm for 16 hours, the aqueous solution was filtered with a filter paper. The solution filtered in this way primarily titrated to pH 10.0 with a 0.1N caustic soda solution and then it was counter-titrated to pH 2.7 with a 0.1N hydrogen chloride solution, and the amount of polymer material not cross-linked was calculated from the amount needed for neutralization.

Experimental Example 3

Measurement of Absorbing Power Under Pressure of Superabsorbent Polymer

The absorbing power under pressure of the superabsorbent polymers obtained in the examples and comparative examples was measured according to the EDANA WSP 242.2 method. Specifically, after uniformly distributing 0.9 g of the specimen having the particle size of 850 to 150 μm among the superabsorbent polymer powders of the examples and comparative examples in a cylinder regulated in the EDANA method and pressing the specimen with a pressure of 21 g/cm2 by using a piston and a weight, the absorbing power under pressure was calculated as the amount of the 0.9% salt water solution that was absorbed in the specimen for 1 hour.

Experimental Example 4

Measurement of Content of Fine Powder in Final SAP powder

The weight ratio of the powder having the particle size of less than 150 μm among the superabsorbent polymer prepared by above method was measured. The content was measured as a ratio of the powder remaining in the upper part of sieves by shaking the sieves having a mesh size of 850 μm, 600 μm, 300 μm and 150 μm with a frequency of 1.0 mm for 10 minutes according to the EDANA WSP 220.0 method.

The results of Experimental Examples 1 to 4 are listed in the following Table 1.

TABLE 1

Results of Experimental Examples 1 to 4

| | Water holding capacity (g/g) | Water-soluble component (wt %) | Absorbing power under pressure (g/g) | Content of particles having particle size of less than 150 μm (weight %) |
|---|---|---|---|---|
| Example 1 | 36.4 | 8.6 | 25.2 | 0.7 |
| Example 2 | 36.1 | 8.9 | 25.6 | 1.1 |
| Example 3 | 36.0 | 8.0 | 26.3 | 0.8 |
| Example 4 | 34.2 | 15.3 | 24.8 | 0.7 |
| Example 5 | 35.2 | 13.7 | 25.3 | 0.9 |

TABLE 1-continued

Results of Experimental Examples 1 to 4

|  | Water holding capacity (g/g) | Water-soluble component (wt %) | Absorbing power under pressure (g/g) | Content of particles having particle size of less than 150 μm (weight %) |
|---|---|---|---|---|
| Comparative Example 1 | 37.6 | 12.4 | 23.4 | 1.6 |
| Comparative Example 2 | 34.2 | 15.4 | 23.6 | 0.8 |
| Comparative Example 3 | 34.8 | 16.2 | 21.7 | 1.4 |
| Comparative Example 4 | 34.4 | 13.9 | 23.3 | 0.7 |
| Comparative Example 5 | 35.1 | 14.2 | 22.8 | 1.7 |

From the results disclosed above, it is recognized that when the surface cross-linking reaction is carried out by spraying the solution including the surface cross-linking agent to each group of polymer having different particle sizes, the surface cross-linking agent can be uniformly distributed to the whole polymer and the surface cross-linking can be uniformly and effectively carried out, and thus high water holding capacity and absorbing power under pressure can be secured while lowering the content of the water-soluble component.

Specifically, the superabsorbent polymer of the examples can significantly reduce the content of the water-soluble component and can secure water holding capacity and absorbing power under pressure that are equal or superior to the superabsorbent polymer of the comparative examples. Particularly, in the examples, the fine powders having the particle size of less than 150 μm agglomerate together and form granules, and the amount of the fine powder generated in the process and the amount of the fine powder included in the final product were reduced by treating the one group of particles having the particle size of less than 150 μm with the surface cross-linking agent individually.

The water holding capacity of the superabsorbent polymer relates to the evaluation of the moisture absorbing performance, that is, it relates to basic performance of the superabsorbent polymer, and the water-soluble component relates to the content of the component that is soluble in water in the superabsorbent polymer, for example, to the content of a low molecular weight polymer component.

Generally, the property of the superabsorbent polymer can be evaluated as being superior when the water holding capacity and the absorbing power under pressure are higher, and when the superabsorbent polymer is applied to consumer goods like a diaper, there is less displeasure of a user due to wetness, and the property of the superabsorbent polymer can be evaluated as being superior when the amount of the water-soluble component is lower. However, it is generally known that the higher the water holding capacity, the higher the content of the water-soluble component, and there have been difficulties in improving overall properties of the superabsorbent polymer.

However, it is recognized that the superabsorbent polymer prepared in Examples 1 to 3 can maintain the low content of the water-soluble component while having high water holding capacity and absorbing power under pressure, and the content of the fine powder included in the final product is low. Furthermore, in the case of surface treating the superabsorbent polymers prepared in Examples 4 and 5 after classifying the same by particle size, they show superior properties to the case without classifying the same.

EXPLANATION OF NUMBERS

10: Milling device for polymer
12: Polymer feeder
20: First classifying device
32: First surface cross-linking agent sprayer
34: Second surface cross-linking agent sprayer
40: Surface cross-linking reactor
42: First surface cross-linking reactor
44: Second surface cross-linking reactor
50: Second classifying device

What is claimed is:

1. A method of preparing a superabsorbent polymer, including the steps of:
    preparing a hydrous gel phase polymer by thermal polymerizing or photo-polymerizing a monomer composition including a water-soluble ethylene-based unsaturated monomer and a polymerization initiator;
    drying the hydrous gel phase polymer;
    milling the dried polymer;
    classifying the milled hydrous gel phase polymer into two or more grades by particle size;
    adding a surface cross-linking agent to each separate hydrous gel phase polymer classified into two or more grades;
    feeding the hydrous gel phase polymer classified into two or more grades to a surface cross-linking reactor, after the step of adding the surface cross-linking agent to each hydrous gel phase polymer classified into two or more grades;
    carrying out a surface cross-linking reaction of each hydrous gel phase polymer to which the surface cross-linking agent is added; and
    combining each surface cross-linked hydrous gel phase polymer to form a superabsorbent polymer,
    wherein the classifying step is carried out into two grades of the particles having a particle size of less than 150 μm and the particles having a particle size of 150 μm to 850 μm, or
    the classifying step carried out into three grades of particles having a particle size of less than 150 μm, particles having a particle size of 150 μm or more and less than 300 μm, and particles having a particle size of 300 μm to 850 μm, or
    the classifying step carried out into four grades of particles having a particle size of less than 150 μm, particles having a particle size of 150 μm or more and less than 300 μm, particles having a particle size of 300 μm or more and less than 600 μm, and the particles having a particle size of 600 μm to 850 μm.

2. The method of preparing a superabsorbent polymer according to claim 1, further including the step of classifying the surface cross-linked hydrous gel phase polymer into the particles having a particle size of 150 to 850 μm, after the step of surface cross-linking reaction.

3. The method of preparing a superabsorbent polymer according to claim 1, further including the step of pulverizing the hydrous gel phase polymer to have the particle size of 1 to 15 mm, before the drying step of the hydrous gel phase polymer.

4. The method of preparing a superabsorbent polymer according to claim 1, wherein the drying step of the hydrous gel phase polymer is carried out at a temperature of 150° C. to 250° C.

5. The method of preparing a superabsorbent polymer according to claim 1, wherein the surface cross-linking agent is at least one selected from the group consisting of a polyhydric alcohol compound; an epoxy compound; a polyamine compound; a haloepoxy compound; a condensation product of the haloepoxy compound; an oxazoline compound; a mono-, di-, or polyoxazolidinone compound; a cyclic urea compound; a polyvalent metal salt; and an alkylene carbonate compound.

6. The method of preparing a superabsorbent polymer according to claim 1, wherein 0.001 to 5 parts by weight of the surface cross-linking agent is added to 100 parts by weight of the milled polymer.

7. The method of preparing a superabsorbent polymer according to claim 1, wherein the surface temperature of the milled polymer is 20 to 90° C. in the step of adding the surface cross-linking agent.

8. The method of preparing a superabsorbent polymer according to claim 1, wherein the temperature of the added surface cross-linking agent is 10 to 60° C.

9. The method of preparing a superabsorbent polymer according to claim 1, wherein the surface cross-linking reaction is carried out for 1 minute to 120 minutes.

10. The method of preparing a superabsorbent polymer according to claim 1, wherein a temperature increase for the surface cross-linking reaction is carried out by providing one or more heat sources selected from the group consisting of steam, electricity, ultraviolet rays, and infrared rays.

11. The method of preparing a superabsorbent polymer according to claim 1, wherein the water holding capacity measured according to EDANA WSP 241.2 method is 30 g/g to 40 g/g.

12. The method of preparing a superabsorbent polymer according to claim 1, wherein the amount of water-soluble component of the superabsorbent polymer measured according to the EDANA WSP 270.2 method is 13 weight % or less.

13. The method of preparing a superabsorbent polymer according to claim 1, wherein the absorbing power under pressure measured by the EDANA WSP 242.2 method is 23 g/g or more.

* * * * *